(12) United States Patent
Mullins

(10) Patent No.: US 12,616,177 B2
(45) Date of Patent: *May 5, 2026

(54) ON DEMAND-DELAYED BUOY RELEASE

(71) Applicant: Russ Mullins, Ferndale, WA (US)

(72) Inventor: Russ Mullins, Ferndale, WA (US)

( * ) Notice: Subject to any disclaimer, the term of this patent is extended or adjusted under 35 U.S.C. 154(b) by 67 days.

This patent is subject to a terminal disclaimer.

(21) Appl. No.: 18/791,713

(22) Filed: Aug. 1, 2024

(65) Prior Publication Data

US 2026/0033469 A1 Feb. 5, 2026

(51) Int. Cl.
*A01K 75/04* (2006.01)
(52) U.S. Cl.
CPC .................................... *A01K 75/04* (2013.01)
(58) Field of Classification Search
CPC ........ A01K 75/04; A01K 93/02; A01K 69/08; B63B 7/26
USPC .............................................. 441/7; 116/210
See application file for complete search history.

(56) References Cited

U.S. PATENT DOCUMENTS

| | | | | |
|---|---|---|---|---|
| 3,426,472 A | * | 2/1969 | Richard | ................. A01K 69/08 |
| | | | | 43/100 |
| 4,177,601 A | * | 12/1979 | Morton | ................. A01K 69/08 |
| | | | | 43/103 |
| 4,262,379 A | * | 4/1981 | Jankiewicz | ............ A01K 69/08 |
| | | | | 441/2 |
| 4,538,376 A | * | 9/1985 | Morton | ................. A01K 69/08 |
| | | | | 43/100 |
| 10,232,914 B1 | * | 3/2019 | Roth | ........................ B63B 35/26 |
| 11,737,437 B1 | | 8/2023 | Mullins | |
| 12,246,800 B2 | * | 3/2025 | Ali | ........................... B63B 22/06 |
| 2007/0264890 A1 | * | 11/2007 | Brown | ................... A01K 69/00 |
| | | | | 441/30 |
| 2022/0132819 A1 | * | 5/2022 | Chadwick | .............. A01K 69/08 |
| | | | | 43/102 |

* cited by examiner

*Primary Examiner* — Christopher D Hutchens

(57) ABSTRACT

An apparatus and technique for underwater storage and deployment of a fishing line and buoy includes a mesh cylinder coupled to a fishing apparatus. A buoy is attached to a buoy line coupled to the fishing apparatus and the buoy line and buoy are stowed within the mesh cylinder in a first position. A drawstring holds a top perimeter of the mesh cylinder closed until intentionally released. Upon release of the drawstring, the buoy and buoy line escape the mesh cylinder. The buoy then pulls the buoy line to the surface where the fishing apparatus can be recovered by the fisher.

20 Claims, 10 Drawing Sheets

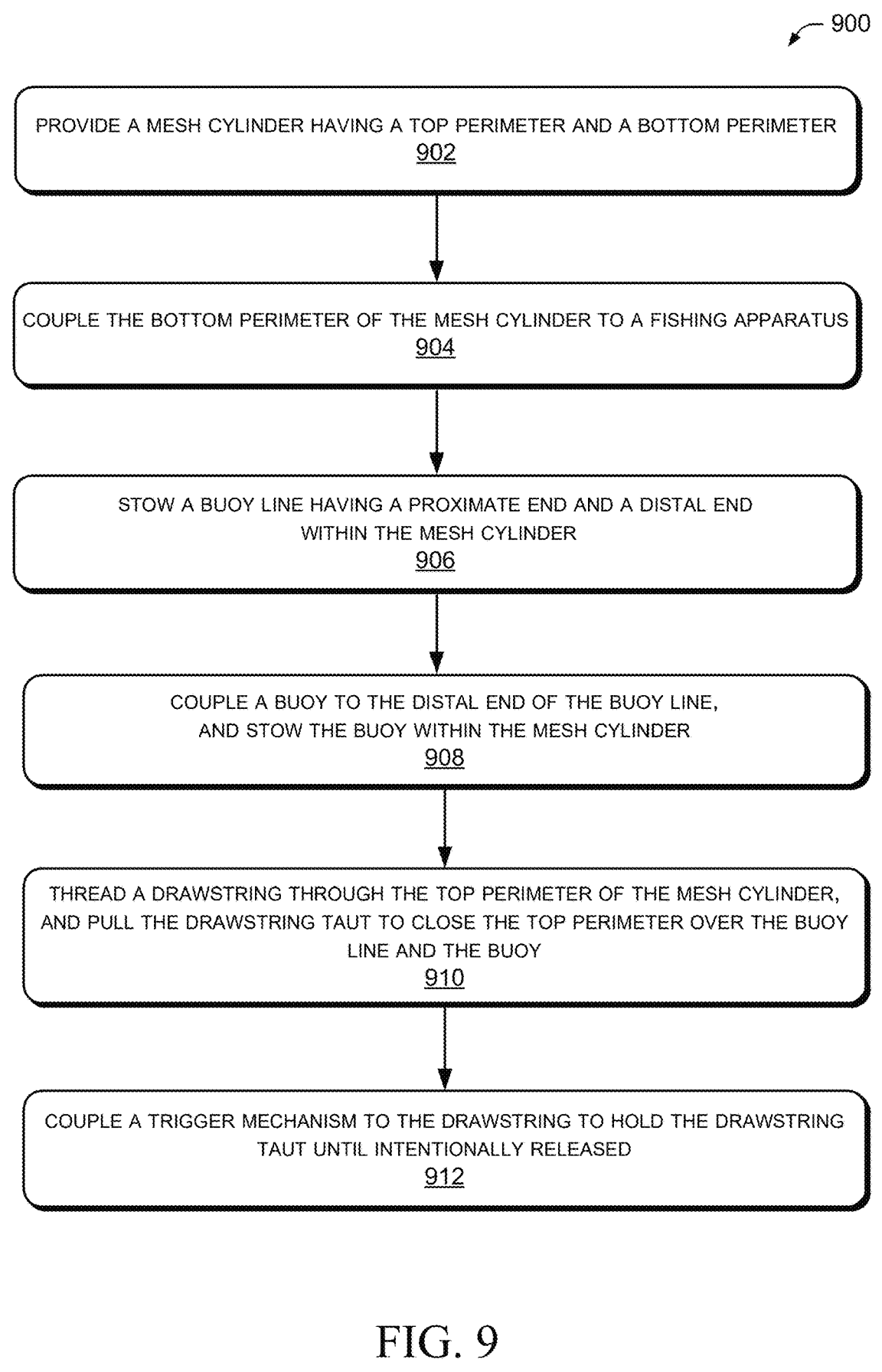

900

PROVIDE A MESH CYLINDER HAVING A TOP PERIMETER AND A BOTTOM PERIMETER
902

COUPLE THE BOTTOM PERIMETER OF THE MESH CYLINDER TO A FISHING APPARATUS
904

STOW A BUOY LINE HAVING A PROXIMATE END AND A DISTAL END
WITHIN THE MESH CYLINDER
906

COUPLE A BUOY TO THE DISTAL END OF THE BUOY LINE,
AND STOW THE BUOY WITHIN THE MESH CYLINDER
908

THREAD A DRAWSTRING THROUGH THE TOP PERIMETER OF THE MESH CYLINDER,
AND PULL THE DRAWSTRING TAUT TO CLOSE THE TOP PERIMETER OVER THE BUOY
LINE AND THE BUOY
910

COUPLE A TRIGGER MECHANISM TO THE DRAWSTRING TO HOLD THE DRAWSTRING
TAUT UNTIL INTENTIONALLY RELEASED
912

FIG. 9

ON DEMAND-DELAYED BUOY RELEASE

BACKGROUND

This disclosure relates to devices for underwater storage and deployment of buoys and lines and particularly to devices for the underwater deployment of buoys and lines for use with crab, lobster and other shellfish and fish traps. The disclosure eliminates traditional vertical buoy lines in the water column in order to eliminate risk of whale and other sea life entanglement and mortality.

Fish and shellfish traps and the like lie on the ocean floor and their recovery is effected by means of a vertical line connected to a surface float or buoy. Often the buoy line is required to pull loads exceeding 5000 lbs. because shellfish gear can become buried in sand or hung up on other obstacles that require extreme force in order to dislodge and recover the trap. The surface float is almost essential for the location and recovery of the trap. However, the existence of vertical buoy lines in the water column and the associated exposed surface buoys has led to widespread large whale and sea turtle entanglement issues that have unacceptably high mortality rates. The widespread use of vertical buoy lines and the associated harm to protected species has led to the premature closure of multi-million-dollar fish and shellfish fisheries.

To address this problem several devices have been invented that allow a buoy attached to a fish trap to be released after some time interval, or by radio or sonar control. Some examples of these devices are found in the following U.S. Patents. U.S. Pat. No. 3,426,472 to Richard teaches an alloy link that is designed to corrode in salt water over a certain time period. The buoy is suspended just above the trap with the link restraining the buoy to keep it near the trap. Once the link corrodes through, the buoy is free to rise to the surface where it can be recovered. Different alloys produce different break times so any delay up to 14 days can be selected.

U.S. Pat. No. 3,724,120 to Richard teaches an improved device for releasing buoys that uses an anode and cathode. The cathode can be reused, while the anode is destroyed.

U.S. Pat. No. 4,126,415 to Blockburger teaches an underwater release mechanism for a shackle including a shaft releasably journaled in a casing and held in position by a frangible link to be spring biased to release a shackle hook upon remote actuation by a radio signal, causing the link to fracture whereby the shackle is released, and the release mechanism floats to the surface. A rope canister can be attached to the casing with one end of the rope tied to the shackle whereby after release the canister end of the rope is tied to the float to mark the spot of the shackle.

U.S. Pat. No. 4,262,379 to Jankiewicz teaches a marker buoy attached to an object such as a lobster or crab trap by a latch and released by a trigger struck by a falling weight. A sealed buoy compartment contains a first permanent magnet holding the weight in upper position by a supportive pole relationship to the poles of a second permanent magnet on the weight and releasing the weight when the first magnet is pivoted to a relative position of poles not sufficiently supportive of the weight. The first magnet is pivoted by an electric motor controlled by an electric clock (or an optional radio signal). Setting of the clock and other operations are accomplished without disturbing compartment seals by an external hand-held magnet operating on internal magnetic reed switches. A line tethers the buoy to the object when the latch is released.

U.S. Pat. No. 6,261,142 to Fiotakis teaches a buoy that has a release mechanism that permits the buoy to be automatically released to ascend to the surface. The release unit may be operated by a remotely transmitted signal or initiated directly by a timer or a controller where specific circumstances dictate.

U.S. Pat. No. 7,534,152 to Lloyd et al. teaches an underwater buoy release system having a moment arm release system. The moment arm release system has a magnetically attractive arm structure connected to a buoy. The buoy release system further includes an electromechanical device that moves the magnetically attractive elements toward, and away from, the magnetically attractive arm structure. The buoy release system further includes a signal reception device, wherein the signal reception device that receives a remote signal from a transmission device.

Note that the latter group of patents employ line enclosures or line spools that require specialized buoy lines or ropes that are not typically used in shellfish and fish pot fisheries. Their incorporation into existing fishing operations is not practical due to design limitations. The current disclosure solves this problem by allowing for the use of traditional and/or industry standard buoy lines and buoys.

SUMMARY

This Summary is provided to introduce a selection of concepts in a simplified form that are further described below in the Detailed Description. This Summary is not intended to identify key features or essential features of the claimed subject matter, nor is it intended to be used as an aid in isolation to determine the scope of any claimed subject matter.

The instant disclosure overcomes the difficulties described above while eliminating the risk of whale entanglement. In brief and at a high level this disclosure describes, among other things, improved techniques and apparatus for setting and recovering shellfish traps and the like. More specifically, the disclosure relates to devices, methods, and techniques for storing the buoy line and buoy at the water's bottom without the need for a persistent surface float or a buoy line in the water column. A retention device including a mesh cylinder with top and bottom perimeters is disclosed. The bottom perimeter can be attached to a fishing apparatus. A buoy is attached to a buoy line coupled to the fishing apparatus and the buoy line and buoy are stowed within the mesh cylinder in a first position. A drawstring holds a top perimeter of the mesh cylinder closed until intentionally released. Upon release of the drawstring, the buoy and buoy line escape the mesh cylinder. The buoy rises to the surface with the buoy line attached. Accordingly, the buoy line is not in the water column (as a potential hazard to sea life) until the fishing apparatus is ready to be retrieved.

One embodiment of the retention device can comprise a retrofit to be added to a traditional trap (lobster, crab, fish, etc.). The retention device can be secured on the top of the traditional trap, for example. Another embodiment comprises a specialized line and buoy retention container that can be attached to the end(s) of a string of submerged traps known as "groundlines" or "trawls." The line retention containers can have square or circular line storage compartments based on specific applications. Both line-handling embodiments can make use of a galvanic or mechanical timer release or an on-demand release that is triggered by a signal (e.g., an electronic or acoustic signal) remotely transmitted from the surface, or other release technique.

Unlike prior art designs, orderly storage of the buoy line and buoy in a form which can be applied to existing commercial fisheries is achieved. Buoy line and buoys can be managed by the retention device in such a way as to minimize the risk of line tangles or snarls that prevent the buoy from reaching the surface, resulting in gear loss and ghost gear ecological damage. For example, the instant disclosure provides keeping the buoy and associated lines in a compact package as part of the retention device or in the line retention container. Uniquely, a buoy can be nested and securely held in place at the center of a coil of line. This keeps the line coil in a neat, tangle-free, form until the buoy is released to the surface.

Additionally, the current disclosure provides operationally viable repacking and redeployment capabilities, as well as easy adjustment of the line capacity as required for tangle-free operation in varied depths. Frequently, fishers are required to attach buoy release systems to the end of strings of traps connected by a common line and spaced up to ¼ mile apart. Slack in the common line between the buoy release system and the nearest trap often drifts with the current near the bottom. As the common line drifts over the buoy release system, it can catch on any buoys or other apparatus floating above, or protruding from, the buoy release system causing buoy fouling and probable system failure. Accordingly, slack in the common line is undesirable. The current disclosure uniquely solves this problem by completely enclosing the buoy and buoy line within the retention device, therefore, system failures are prevented.

The instant disclosure employs traditional commercial fishing buoy line and buoys which ensures the most durable and practical buoy lines and buoys can be used. Fishers are not required to replace expensive buoy lines or use buoy lines with inferior durability or mechanical functionality.

The retention device of the instant disclosure consists of an adjustable apparatus that secures the buoy line and buoy to the top of a fish or shellfish trap or within a specialized line retention container, or sled, until released. In some embodiments, a galvanic timed release (GTR) coupling or mechanically-triggered release releases the buoy to the sea surface. The GTR coupling timer is constructed of a highly corrosive anode link which breaks after a predetermined period of immersion in seawater. In other embodiments, mechanical releases can be activated by timers or the receipt of a remotely triggered signal, such as an electronic or acoustic signal, or the like.

Upon release, the unrestrained buoy and buoy line rises to the surface so that the trap may be recovered. The present disclosure achieves the critical requirement that the buoy line and buoy be constrained within the apparatus in such a manner that it cannot become fouled, tangled or otherwise compromised by current, debris or other components of the fishing gear, to the point where the buoy and line is not capable of reaching the surface. A smooth and controlled release of the buoy line is maintained to avoid fouling. Thus, it is important that the buoy and, perhaps more importantly, the line associated with it, are packaged in a way to prevent fouling of those lines. Otherwise, even if the buoy were released, fouled lines would not let it reach the surface, resulting in the possible loss of the entire gear set and potential whale entanglement.

The current technique can use a cylindrical line storage compartment (e.g., mesh cylinder) instead of a rectangular line storage compartment. This component uniquely accommodates traditional fishing rope that by design naturally coils in a circular manner. Conversely, the line naturally uncoils upon deployment to the surface in a more organized manner that is far less likely to become fouled or tangled. In addition, it is much quicker and easier to coil typical fishing line or rope into a cylinder than it is a cube. However, the line retention container, within which the mesh cylinder can be affixed, can have a cube shape or other polygonal shape, since it surrounds the mesh cylinder.

BRIEF DESCRIPTION OF THE DRAWINGS

The detailed description is set forth with reference to the accompanying figures.

FIG. 9 is a flow diagram illustrating an example method, according to various implementations.

DETAILED DESCRIPTION

Figure 1:
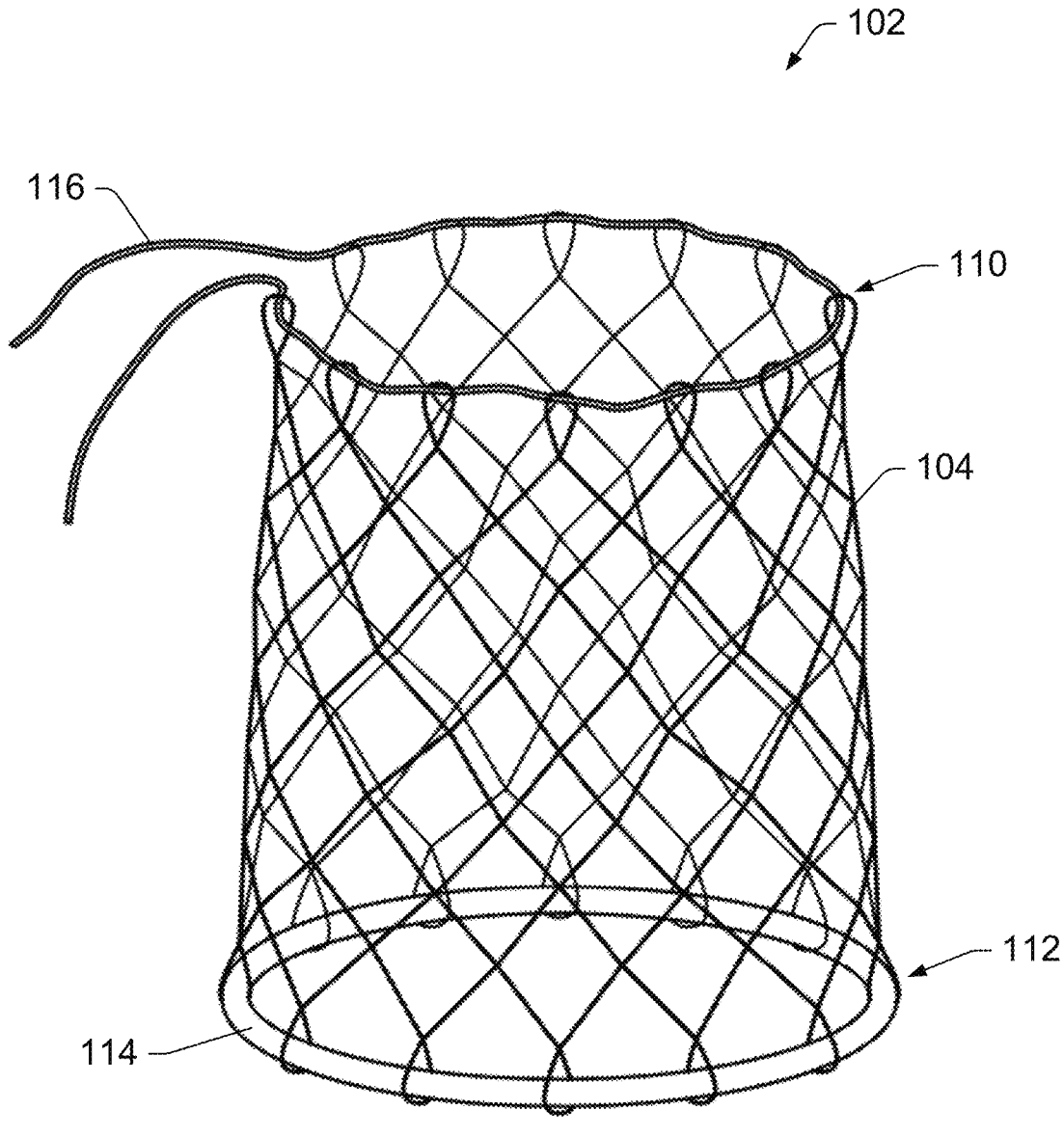
FIG. 1 is a perspective view of an example retention device, including a mesh cylinder and coupling support, according to an implementation.

Representative techniques, devices, and systems disclosed herein provide for restraining a buoy line and buoy of a shellfish trap, or the like, beneath the surface of the water for a predetermined period of time using a retention device, and then deploying the buoy line and buoy in such a manner that the trap can be dependably recovered. Referring to FIGS. 1-7D, a delayed buoy release system 100 is disclosed. The system 100 comprises a retention device 102 and a trigger device 602, and can also include a line retention container 702. In various embodiments, the retention device 102 can be deployed to an existing fish or shellfish trap, or the like, as an add-on or retrofit to form an embodiment of the system 100. In other embodiments, the retention device 102 with the line retention container 702 comprises a system 100. The system 100 can also be coupled to one or more (additional) fish or shellfish traps 804, or the like, to form a combined trap system 802.

The retention device 102 can be added to (e.g., retrofit) all standard commercial-style crab and lobster traps or can be installed into a line retention container 702 (or sled) that can optionally be attached to a string of one or more traps 802. (See, e.g., FIG. 8.) Referring particularly to FIGS. 1-5, the primary component of the retention device 102 comprises a mesh cylinder 104, which can be constructed from a custom-sized piece of high density polyethylene trawl net material, or the like, that is cut based on the size of the trap or specialized enclosure (e.g., line retention container 702). For example, the dimensions and pitch of the netting can be sized based on the circumference or perimeter of the trap receiving the retrofit or that of the specialized container and the amount of buoy line intended. A sheet of netting can be formed into a mesh cylinder by securely joining opposite edges with twine or metal rings, or the like. Accordingly, a mesh cylinder 104 has a generally elliptical top perimeter 110 and a generally elliptical bottom perimeter 112.

A coupling support 114 can be added to the bottom perimeter 112 to provide a robust support structure for coupling the mesh cylinder 104 to another structure, such as a fish trap or a line retention container 702. In some cases, the coupling support 114 can comprise a rigid or semi-rigid hoop, or like structure, with an elliptical, polygonal, or irregular perimeter. In one case, a hoop coupling support 114 can be constructed from a length of flexible plastic pipe or tubing equal to the circumference or bottom perimeter 112 of the mesh cylinder 104. The tubing of the coupling support 114 can be threaded through the webbing of the bottom perimeter 112 of the mesh cylinder 104. The ends of the tubing can then be connected to form a circular hoop.

Figure 2:
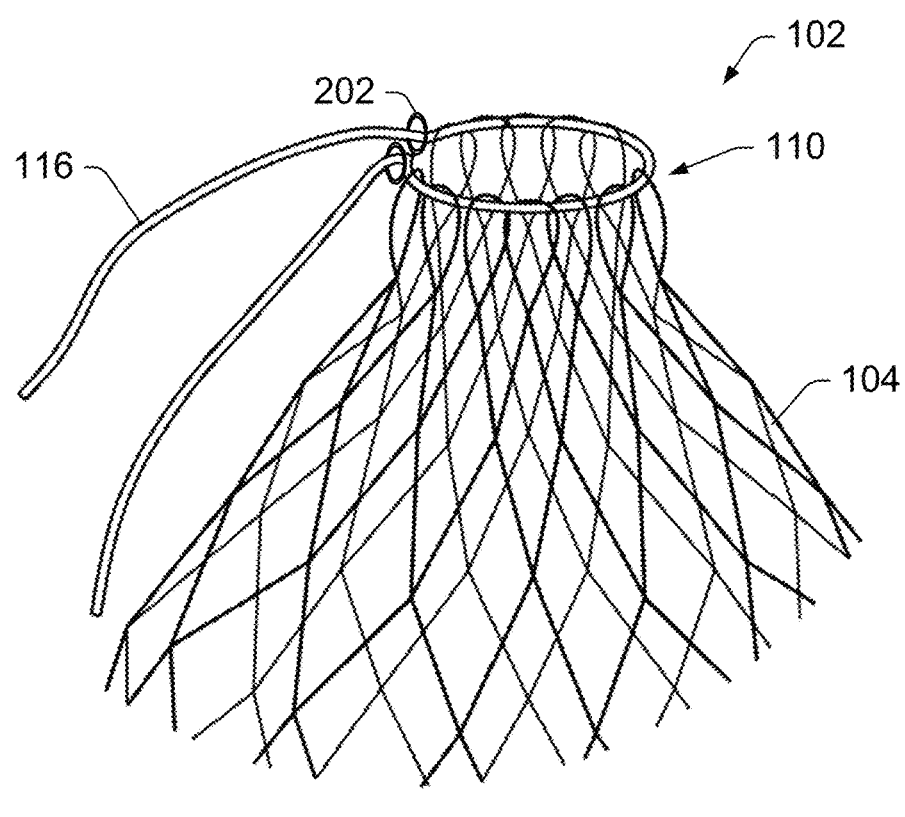
FIG. 2 is a detail view of a drawstring attached to the mesh cylinder, with the drawstring in the first position, according to an implementation.
Figure 3:
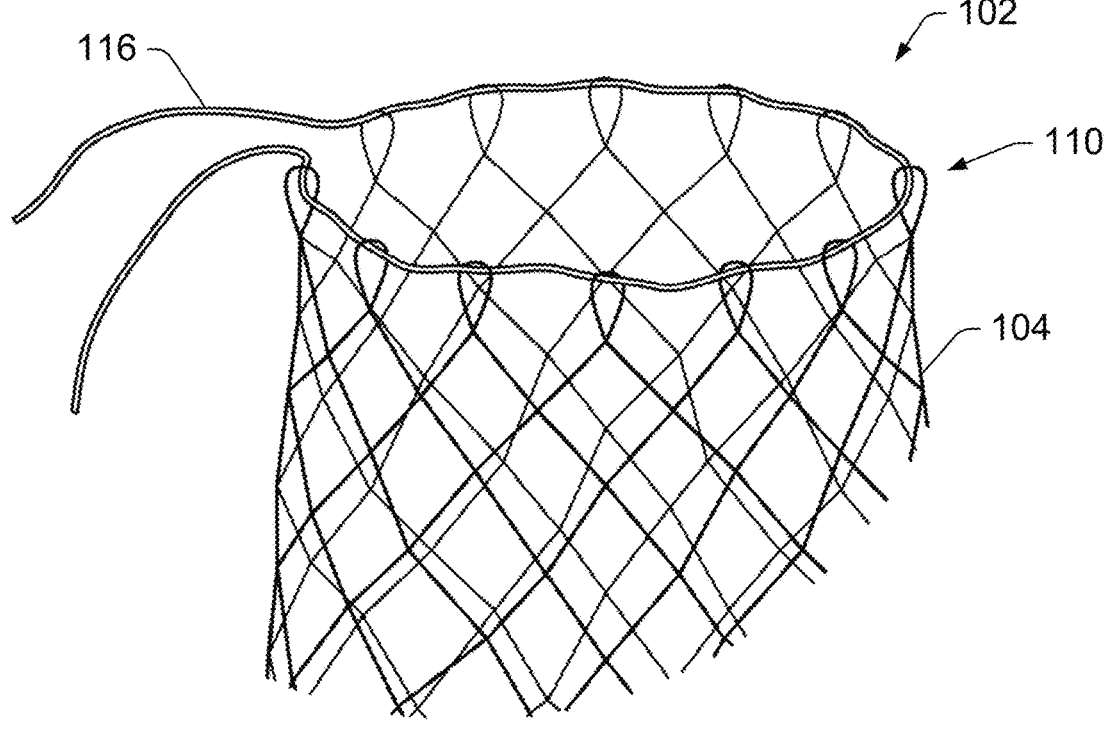
FIG. 3 is a detail view of a drawstring attached to the mesh cylinder, with the drawstring in the second position, according to an implementation.

A drawstring 116 can be threaded through the webbing of the top perimeter 110 of the mesh cylinder 104 to close the top perimeter 110 when in the closed position. For example, the drawstring 116 can be constructed of a length of ⅛" twine (for example—wire or other sizes of strings can also be used). To make sure that the drawstring 116 has sufficient length, the length can be at least 25% greater than the circumference of the coupling support 114 (e.g., hoop). As shown at FIG. 2, when pulled taut, the drawstring 116 pulls the top perimeter 110 together, closing the top perimeter 110 and creating a pucker in the top perimeter 110 of the mesh cylinder 104. This is the closed position. Optionally for convenience, a ring 202 (or the like) can be added to the pucker-edge of the mesh of the top perimeter 110 to allow the drawstring 116 to move without binding or creating excessive friction wear on the net mesh. As shown at FIG. 3, when the drawstring 116 is allowed to slacken (such as when released by a trigger mechanism 602, for example), the top perimeter 110 opens to allow contents of the mesh cylinder 104 to escape (See also FIG. 5.)

Figure 4:
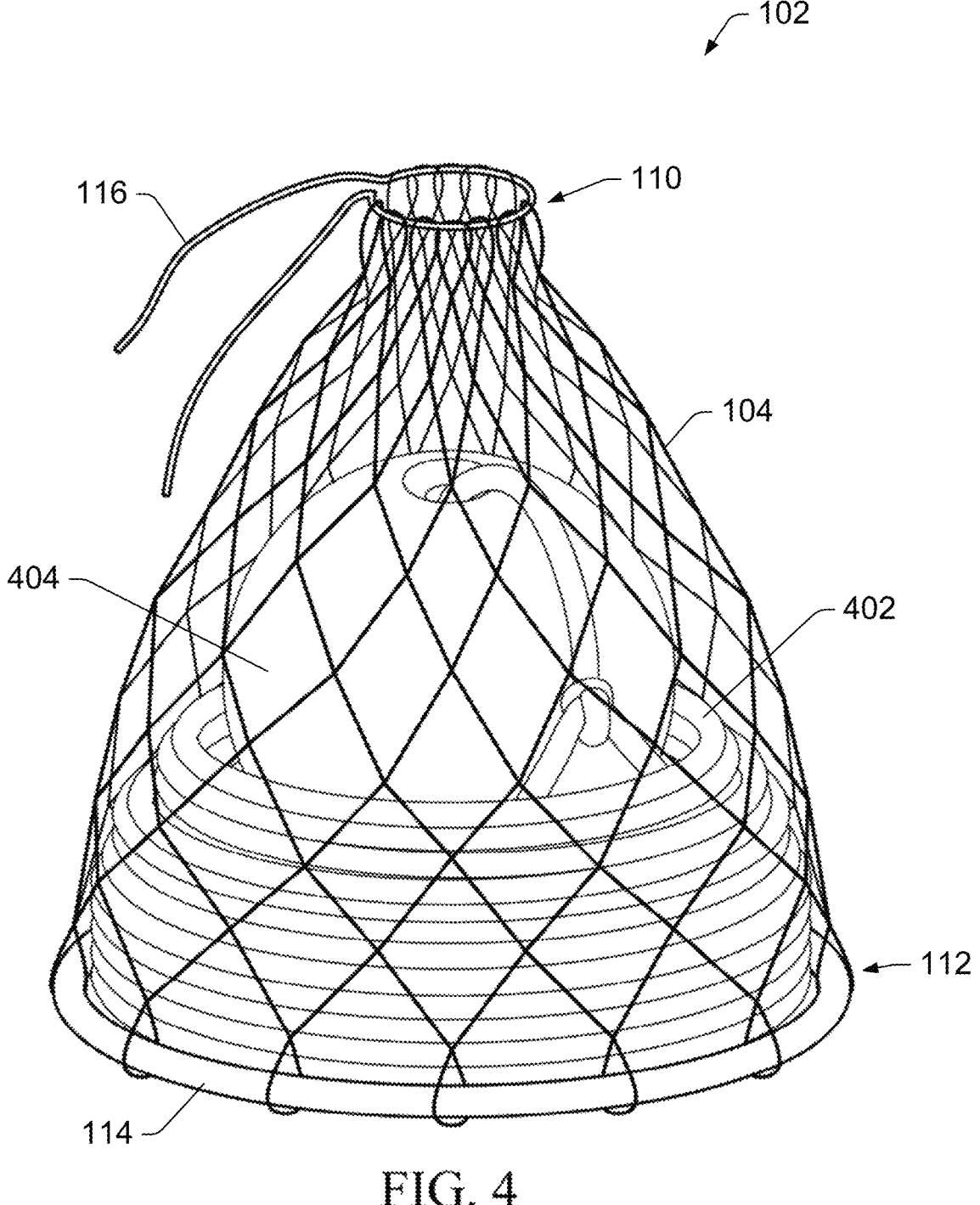
FIG. 4 is a view of a buoy line and buoy stowed within the retention device, with the drawstring in the first position, according to an implementation.

A buoy line 402 having a proximal end and a distal end is added into the mesh cylinder 104, and may be coupled to a fish trap or the line retention container 702, or the like, at the proximal end. A buoy 404 can be coupled to the distal end of the buoy line 402. As shown at FIG. 4, the buoy line 402 is stowed within the mesh cylinder 104 in the closed position. The buoy line 402 can be coiled within the mesh cylinder 104 for ease of deployment. The buoy 404 can be nested in the coils of the buoy line 402 while stowed within the mesh cylinder 104 of the retention device 102. The puckered top perimeter 110 snugly holds the buoy 404 and the buoy line 402 in the stowed position within the retention device 102.

Figure 5:
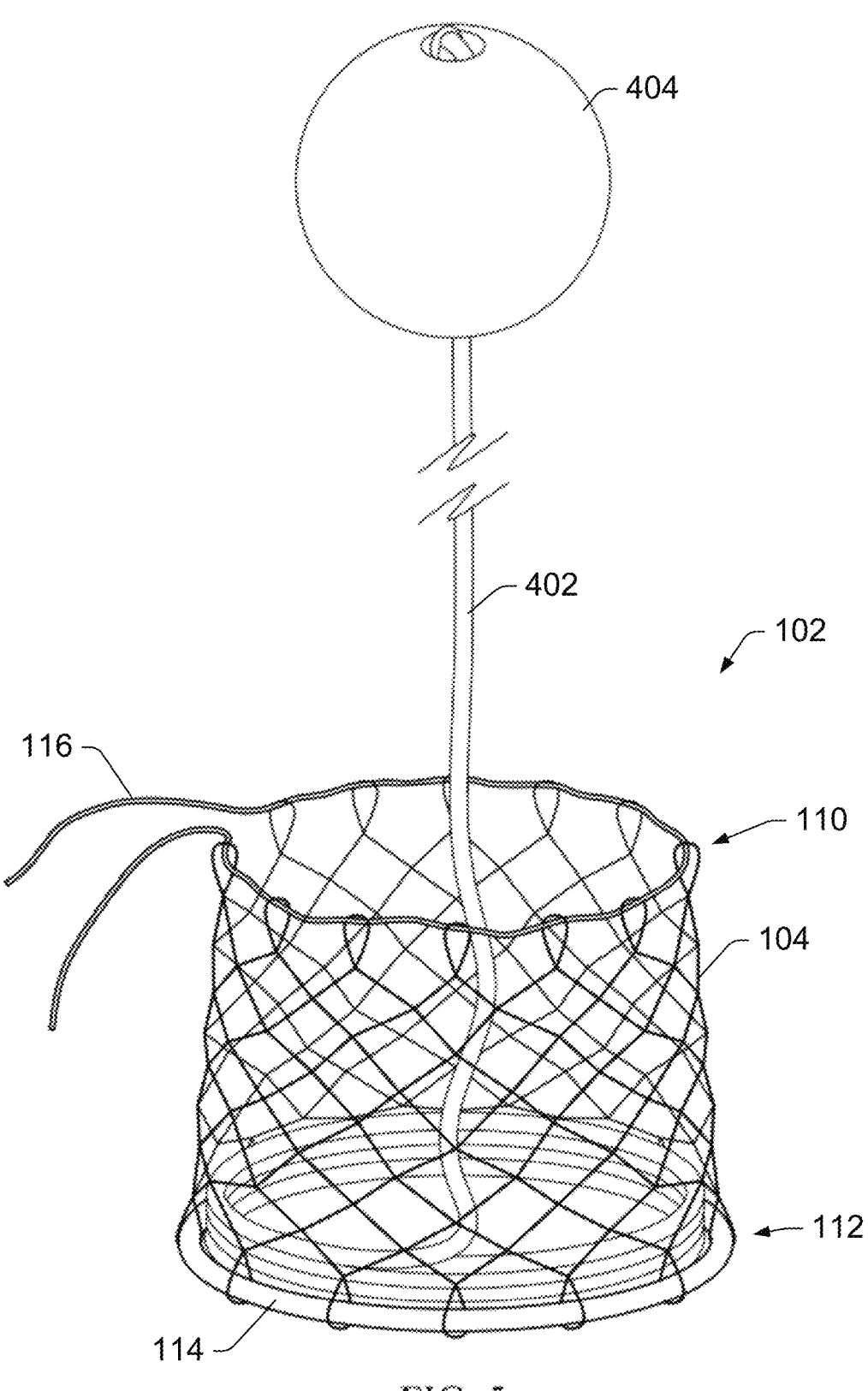
FIG. 5 is a view of a buoy line and buoy being released from the retention device, with the drawstring in the second position, according to an implementation.

As shown at FIG. 5, the buoy line 402 is free to extend in the open position. The buoy 404 attached to the distal end of the buoy line 402 is also free to rise to the water's surface. The buoy 404 is stowed within the mesh cylinder 104 in the closed position (FIG. 4) and is released from the mesh cylinder 104 in the open position (FIG. 5). When the buoy 404 is released from the mesh cylinder 104, the buoy line 402 is pulled out of the mesh cylinder 104 by the buoy 404. In various embodiments, the buoy 404 can comprise a properly sized hard plastic buoy 404 that is rated for extreme depths. For instance, conventional foam buoys can compress at depth, losing flotation and leading to permanent loss of the gear.

Figure 6:
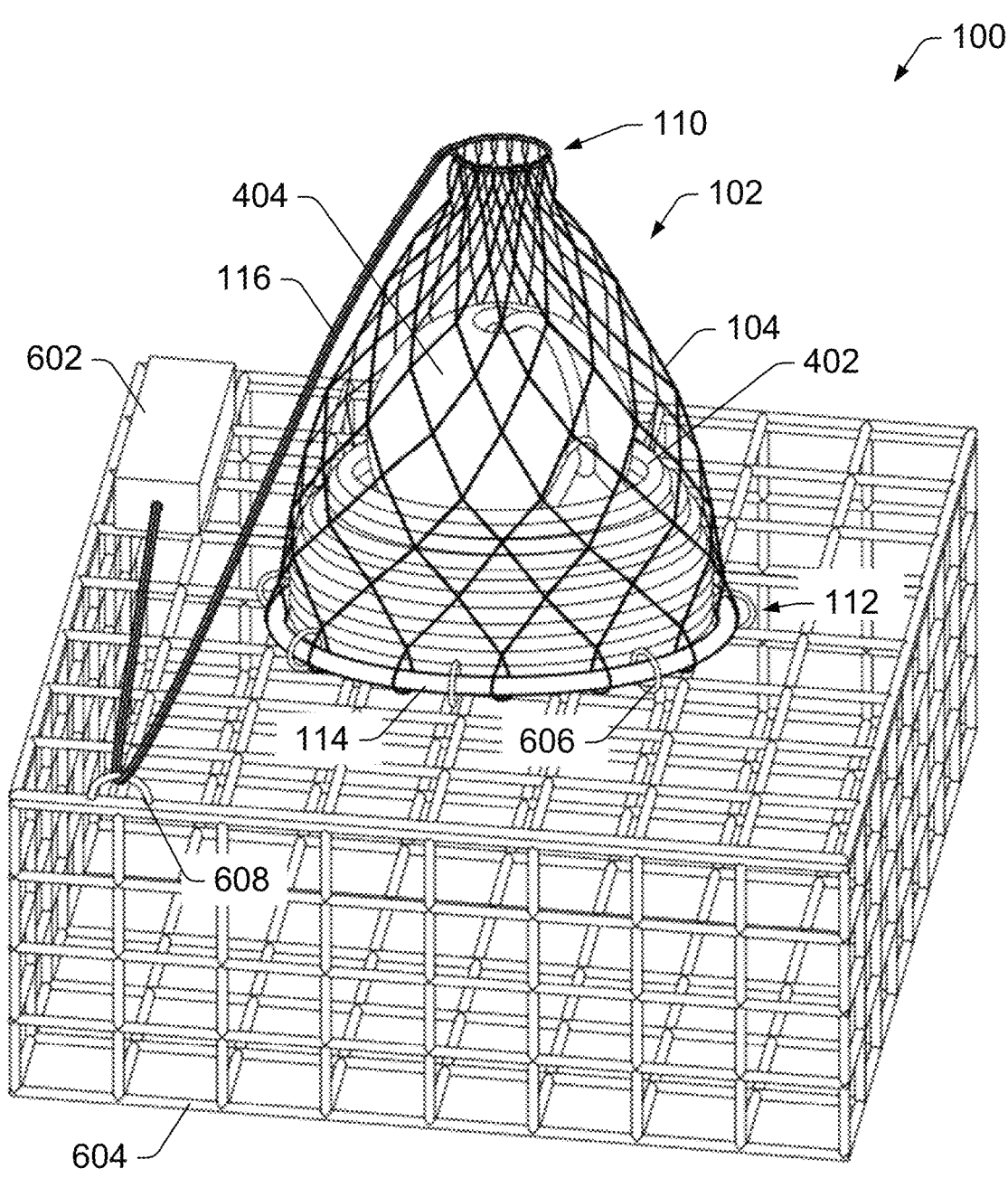
FIG. 6 is a view of the retention device coupled to a fish trap or shellfish trap as an add-on retrofit, according to an implementation.

Referring to FIG. 6, in some cases the retention device 102 can be triggered (to release the buoy 404 and buoy line 402) using one of various trigger mechanisms 602. The trigger mechanism 602 is coupled to the drawstring 116 and configured to hold the drawstring 116 taut and in the closed position until triggered. The trigger mechanism 602 is configured to activate the open position when triggered. In other words, when triggered, the trigger mechanism 602 causes the drawstring 116 to slacken, resulting in the release of the buoy 404 and the buoy line 402 from the mesh cylinder 104.

For example, a galvanic timed release (GTR) link can be provided as a trigger mechanism 602, which breaks after a predetermined period of immersion, releasing the taut drawstring 116 and causing the drawstring 116 to go slack. This allows the top perimeter 110 to open and allows the buoy 404 and buoy line 402 to be released from the mesh cylinder 104 and rise to the surface (See FIG. 5). In another example, an electronic timer or on-demand mechanical acoustic release can comprise a trigger mechanism 602 and trigger the release of the buoy 404 and buoy line 402 to the surface after a time duration as determined (e.g., set) by the user. Any desired delay time between a few hours and several days can be provided using various trigger mechanisms 602.

During the selected delay time, or prior to on-demand release, the retention device 102 or system 100 eliminates vertical buoy lines 402 and surface buoys 404 which are known to harm large whales and other protected species. Once the buoy 404 has reached the surface, it can be retrieved by the fisher. Until the buoy 404 reaches the surface, the gear poses no threat to protected marine species from vertical line entanglement. The fishers are able to plan their trap set and recovery cycles around their selected release periods so that the trap recovery takes place as soon as possible after the emergence of the surface buoy 404.

Referring particularly to FIG. 6, for a retrofit embodiment, the completed retention device 102 can be installed onto a trap 604 (e.g., fish trap or shellfish trap, etc.) by securing the coupling support 114, which can comprise a plastic hoop, for example, to the trap 604 using metal clips, lashing twine or industrial wire ties, or other fasteners 606. The combination of the retention device 102 and the trap 604 comprises one embodiment of the system 100. Note that in some examples the mesh cylinder 104 may be secured to the trap 604 without the coupling support 114, or with an alternate type of coupling technique.

The selected release mechanism 602 is installed and adjusted for the desired delayed release. The coiled buoy line 402 and the buoy 404 are placed inside the mesh cylinder 104 and the drawstring 116 is pulled tight, so that when the drawstring is taut, the pucker of the top perimeter 110 causes downward pressure that holds the buoy line 402 and buoy 404 in place. This feature keeps the buoy 404 from emerging and the buoy line 402 from fouling prior to release. The drawstring 116 can be routed through a D-ring 608 for example, and a tensioner ring (not shown), if desired, and is coupled to the release mechanism 602.

Figure 7A:
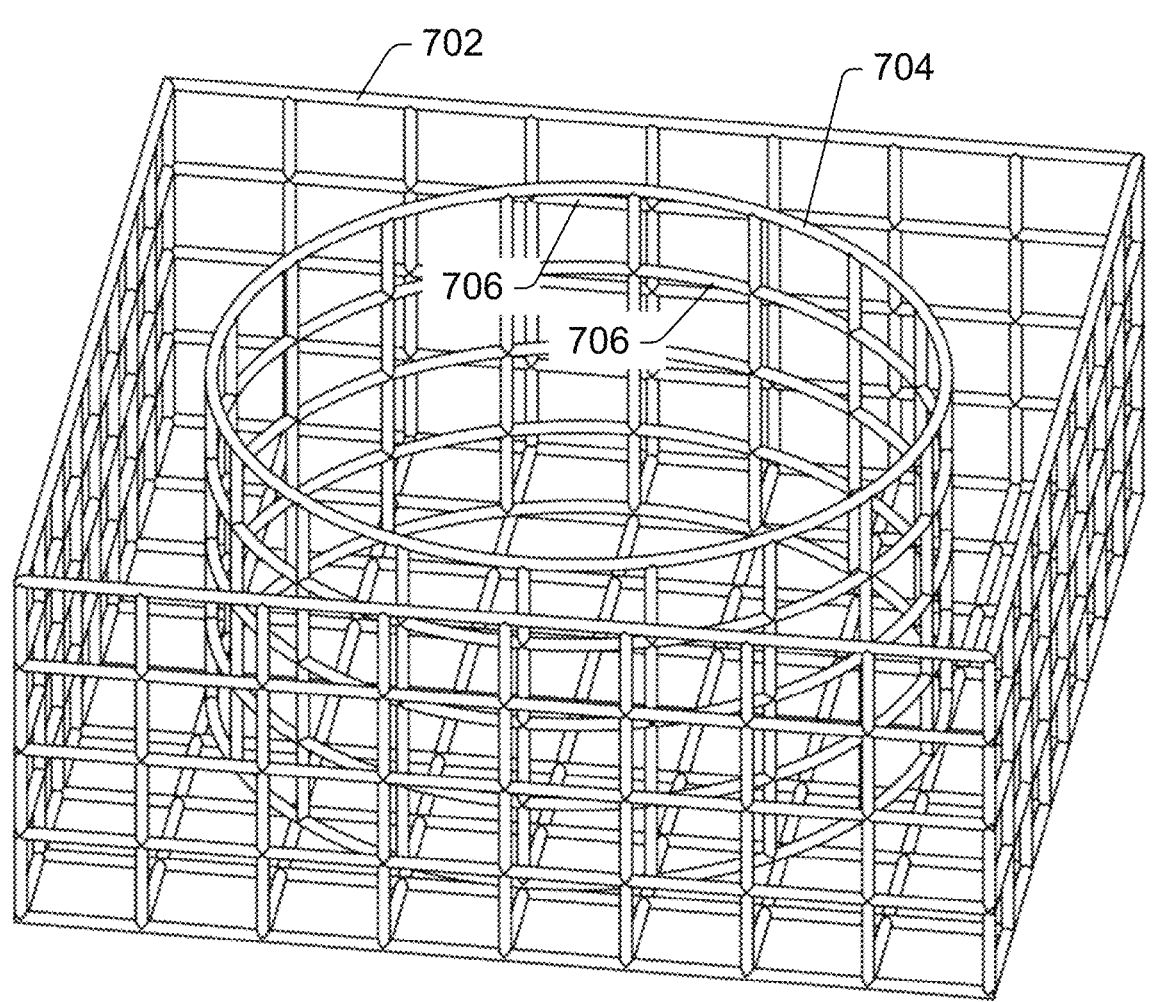
FIG. 7A is a perspective view of an example line retention container, according to an implementation.

Referring to FIGS. 7A-7D, in another embodiment of the system 100, the retention device 102 is used with a line retention container 702. In the embodiment, the completed retention device 102 is installed within the line retention container 702 to form the system 100 (see FIGS. 7B-7D). As illustrated at FIG. 7A, in an embodiment, the line retention container 702 comprises a wire mesh basket or like container with an open top and holes or openings at least on the sides of the container. As shown at FIG. 7A, in some embodiments, a wire cylinder 704 (or like cylinder container) can be nested within and may be coupled to the line retention container 702. The wire cylinder 704 can provide structural support to the line retention container 702 and can also provide structural support to the mesh cylinder 104. The wire cylinder 704 can also guide the coiling action of the buoy line 402 as the buoy line 402 is inserted into the mesh cylinder 104, and can help the coiled buoy line 402 keep the coiled form.

The coupling support 114, for example (or the bottom perimeter 112 of the mesh cylinder 104 in some cases) can be coupled to the rungs 706 (i.e., bottom rungs or side rungs) of the line retention container 702 (and/or the wire cylinder 704) and can be adjusted vertically (moved to higher or lower rungs 706) based on the user's desired quantity of buoy line 402 and/or the size of the buoy 404. For example, the line retention container 702 (and the wire cylinder 704) includes a plurality of coupling points (e.g., the various rungs 706) for height adjustment of the coupling support 114 (or the mesh cylinder 104) within the line retention container 702 and/or the wire cylinder 704.

Figure 7B:
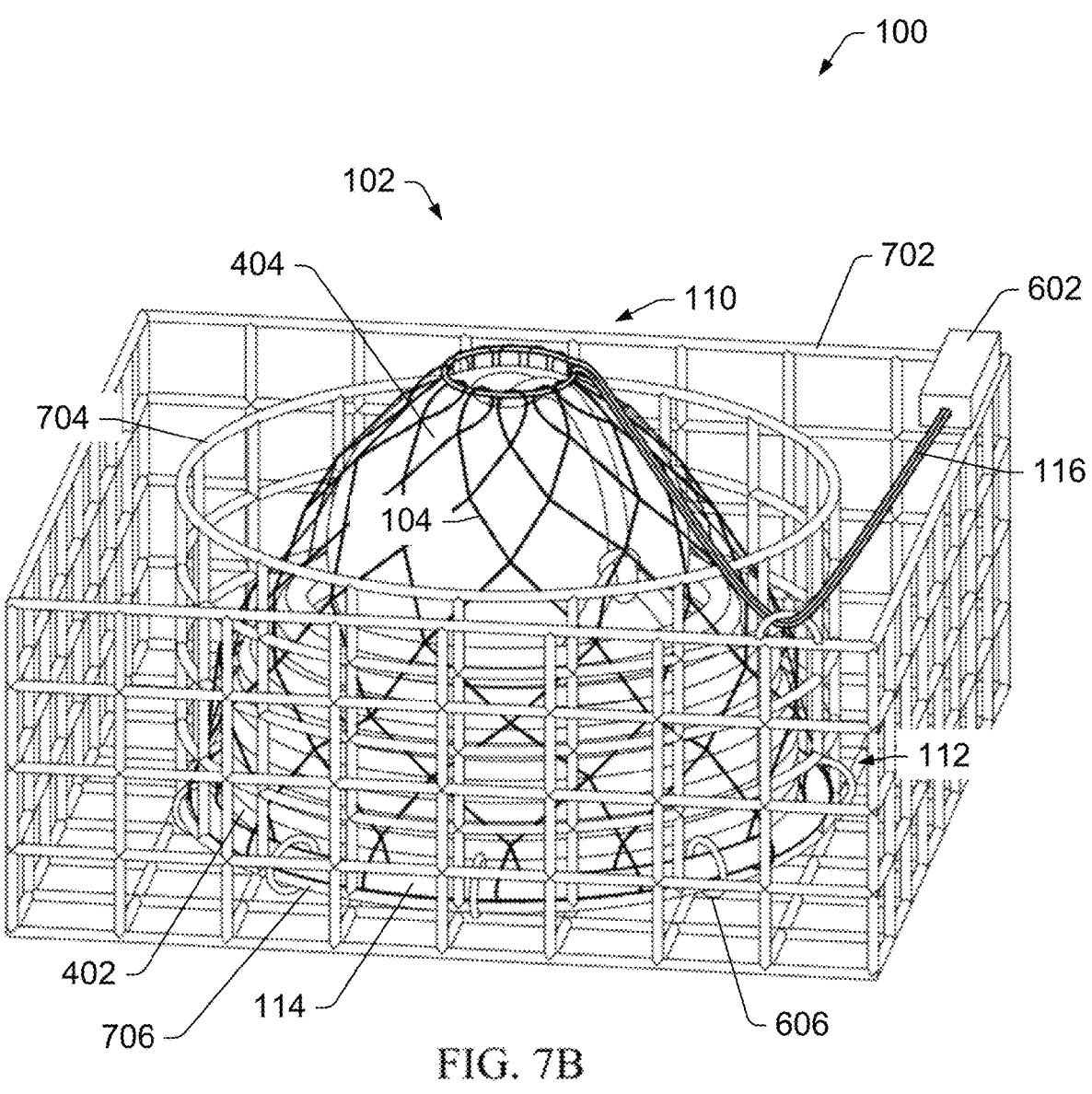
FIG. 7B is a perspective view of the retention device coupled within a line retention container, according to an implementation.
Figure 7C:
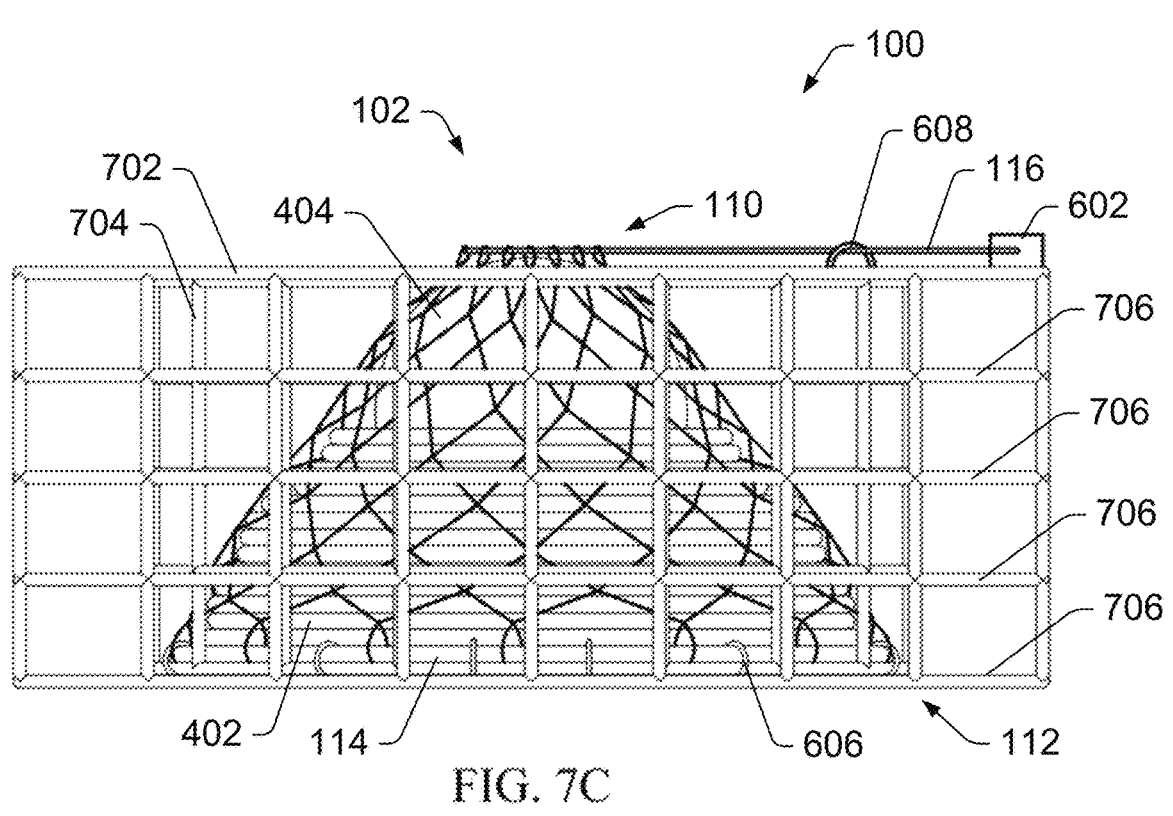
FIG. 7C is a side view showing the retention device coupled within the line retention container in a first position, according to an implementation.
Figure 7D:
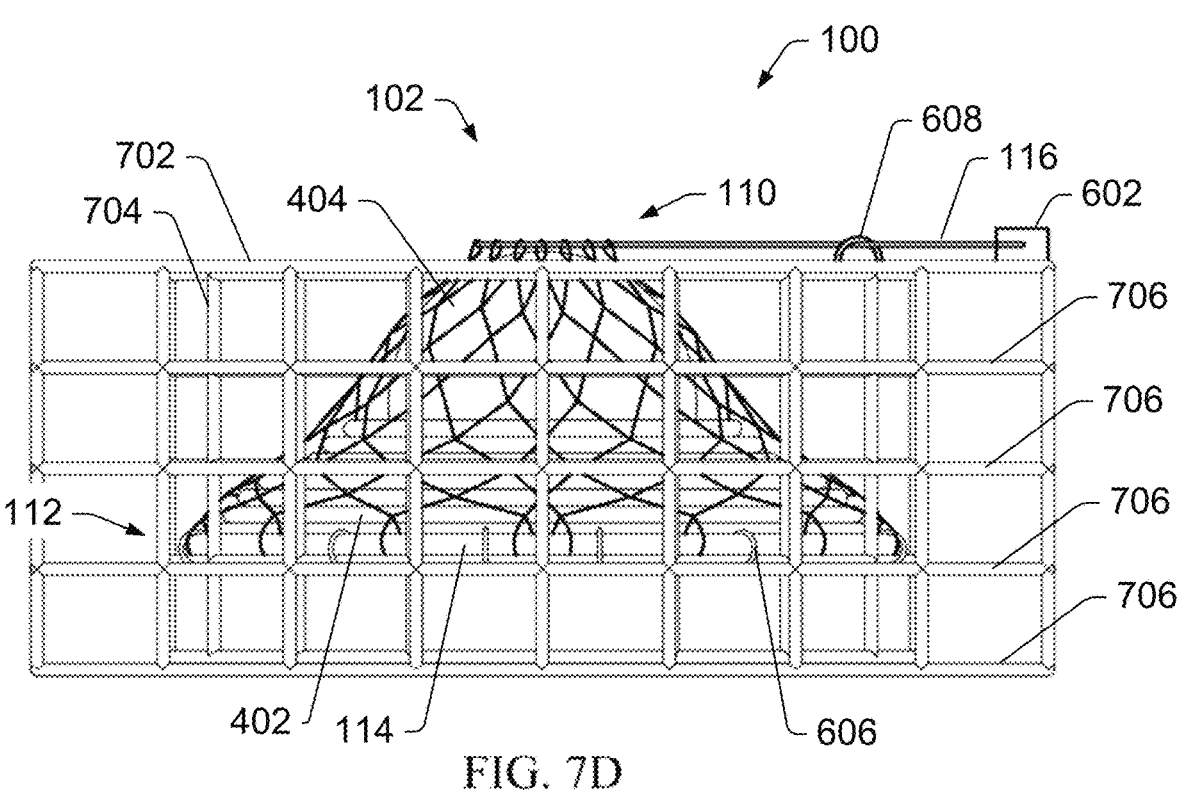
FIG. 7D is a side view showing the retention device coupled within the line retention container in a second position, according to an implementation.

Referring to FIGS. 7B-7D, the coupling support 114 is coupled to the line retention container 702 and/or the wire cylinder 704 via one or more of the plurality of coupling points (rungs 706), based on a desired height of the coupling support 114 within the line retention container 702. The coupling support 114 (e.g., hoop) is attached to the wire mesh rungs 706 on the walls of the line retention container 702 (and/or the wire cylinder 704) using metal clips, lashing twine or industrial wire ties, or other fasteners 606. The mesh cylinder 104 can be mounted to higher rungs 706 within the line retention container 702 (and/or the wire cylinder 704) to provide additional volume for more buoy line 402, or mounted to lower rungs 706 within the line retention container 702 (and/or the wire cylinder 704) to provide less volume for a shorter buoy line 402 or smaller buoy 404 and to remove slack space. As the mesh cylinder 104 (or the coupling support 114) is raised within the wire mesh of the line retention container 702 (and/or the wire cylinder 704), the line capacity increases. Adjustment of line capacity is important so that various amounts of buoy line 402 or different sized buoys 404 are always held tightly in place, so as to prevent fouling and tangles upon deployment and prior to triggered release.

The selected buoy release trigger mechanism 602 is then installed and adjusted. The coiled buoy line 402 and buoy 404 are placed inside the mesh cylinder 104 and the drawstring 116 is pulled tight, so that when the drawstring is taut, the pucker of the top perimeter 110 causes downward pressure that holds the buoy line 402 and buoy 404 in place. This feature keeps the buoy 404 from emerging and the buoy line 402 from fouling prior to release. The drawstring 116 can be routed through a D-ring 608 for example, then a tensioner ring (not shown), if desired, and is coupled to the release mechanism 602.

Figure 8:
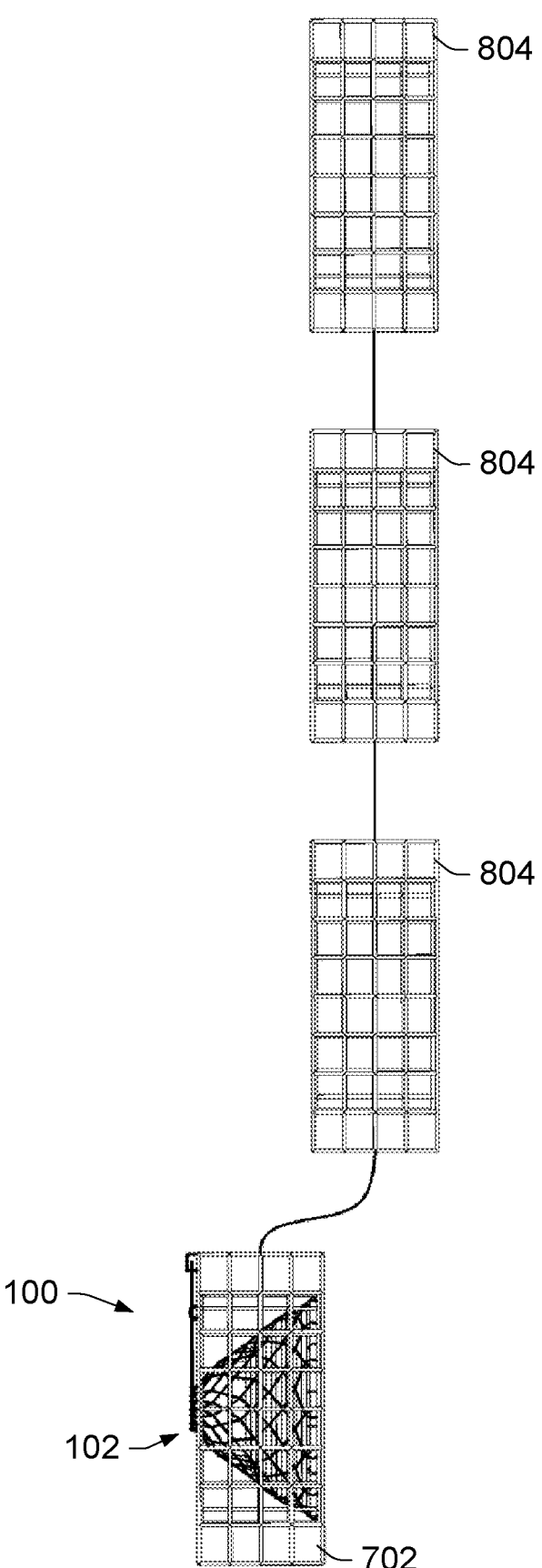
FIG. 8 shows a retention device and line retention container coupled to a plurality of fish or shellfish traps, according to an implementation.

FIG. 8 shows an example of tethering one or more fish and/or shellfish traps 804 (or like devices) to the line retention container 702 and the retention device 102, or in other words the system 100. Alternately, the string of traps 804 can be coupled to the system 100 comprising a retention device 102 coupled to a trap 604. This string of submerged traps 804 are often known as "groundlines" or "trawls," and in combination with the system 100 comprises a trap system 802. The system 100 can be deployed and activated, with a desired delayed response. When triggered, the fisher can retrieve the combined trap system 802, based on the buoy 404 surfacing to indicate the location of the trap system 802.

The present disclosure uniquely provides an effective means of dependably eliminating persistent vertical lines and surface buoys. In addition, the system 100 has design features that make the objects of the disclosure economically viable for use in diverse fisheries. Since commercial fishing is a very dynamic and competitive endeavor, manipulation of traps prior to redeployment must be non-complex, reasonably quick and inexpensive. The present disclosure achieves all three of these requirements through its design and execution.

When a buoy 404 and buoy line 402 is retrieved, it is generally coiled in an orderly fashion mechanically or by hand. The mesh cylinder 104 opens to allow the coil of buoy line to be placed on top of the trap 604 or within the line retention container 702 with the buoy-end of the line 402 being on the top of the coil and the trap-end of the line 402 being on the bottom of the coil. The buoy 404 can then be placed at the center of the coil of line 402 prior to being secured in place by the drawstring 116. The drawstring 116 that holds the top perimeter 110 closed prior to deployment can be permanently secured to the mesh cylinder 104 or another component. When the fisher secures the buoy line 402 and buoy 404 inside the mesh cylinder 104, they pull the drawstring 116 to where it tightly holds the top perimeter 110 of the mesh cylinder 104 by the selected trigger mechanism 602. The act of tightening the drawstring 116 is by design, simple and quick to accomplish. Once the retention device 102 is rigged, it can be deployed from a boat in the typical manner.

The size and dimensions of the retention device 102 and related components can vary based on the application. Regardless of the equipment size, the overall process is the same or similar. In various implementations, a system 100 or retention device 102 may include additional or alternate components, or have different shapes or sizes than those illustrated. Although various implementations and examples are discussed herein, further implementations and examples may be possible by combining the features and elements of individual implementations and examples.

Representative Process

FIG. 9 illustrates a representative process 900 for implementing techniques and/or devices relative to providing retention of a buoy line and buoy (such as the buoy line 402 and the buoy 404, for example), according to various embodiments. The process 900 includes incorporating the retention device (e.g., retention device 102) with an existing fish or shellfish trap or with a line retention container (such as the line retention container 702, for example). The example process 900 is described with reference to FIGS. 1-8.

The order in which the process is described is not intended to be construed as a limitation, and any number of the described process blocks can be combined in any order to implement the process, or alternate processes. Additionally, individual blocks may be deleted from the process without departing from the spirit and scope of the subject matter described herein. Furthermore, the process can be implemented in any suitable hardware, software, firmware, or a combination thereof, without departing from the scope of the subject matter described herein.

At block 902, the process includes providing a mesh cylinder having a top perimeter and a bottom perimeter (such as the mesh cylinder 104, for example). At block 904, the process includes coupling the bottom perimeter of the mesh cylinder to a fishing apparatus (such as a fish or shellfish trap 604 or the line retention container 702, for example). In an example, the process includes attaching a coupling support to the bottom perimeter of the mesh cylinder and coupling the coupling support to the fishing apparatus. In one embodiment, the coupling support comprises a hoop, and includes threading the hoop through the bottom perimeter of the mesh cylinder. In another example, the fishing apparatus comprises a fish trap or a shellfish trap.

In a further example, the fishing apparatus comprises the line retention container configured to hold the mesh cylinder, the buoy line, and the buoy. In the example, the process includes coupling the bottom perimeter of the mesh cylinder to the line retention container at one of a plurality of coupling points within the line retention container to determine a height of the bottom perimeter of the mesh cylinder within the line retention container.

At block 906, the process includes stowing a buoy line having a proximal end and a distal end within the mesh cylinder. At block 908, the process includes coupling a buoy to the distal end of the buoy line, and stowing the buoy within the mesh cylinder. In an example, the process includes coiling the buoy line within the mesh cylinder and nesting the buoy on the coiled buoy line. The proximal end of the buoy line can be coupled to the line retention container or one or more fish traps, for example.

At block 910, the process includes threading a drawstring through the top perimeter of the mesh cylinder, and pulling the drawstring taut to close the top perimeter over the buoy line and the buoy. This state describes the closed position or configuration. At block 912, the process includes coupling a trigger mechanism to the drawstring to hold the drawstring taut until intentionally released.

In an implementation, the process includes coupling the fishing apparatus to one or more fish traps or shellfish traps. For example, the fishing apparatus and one or more fish traps or shellfish traps can comprise a tethered trap system.

In one embodiment, the process includes activating the trigger mechanism to intentionally release the drawstring, thereby causing the drawstring to slacken, allowing the top perimeter of the net cylinder to open in response to the slackening of the drawstring, and allowing the buoy and the buoy line to escape from the net cylinder in response to the opening of the top perimeter of the net cylinder. In various examples, the buoy is allowed to surface, where it can be seen by the user. The user may retrieve the buoy, the buoy line, and any fishing apparatus attached thereto.

In alternate implementations, other techniques may be included in the process in various combinations, and remain within the scope of the disclosure.

Aspects of the present disclosure have been described with the intent to be illustrative rather than restrictive. Alternative aspects will become apparent to those skilled in the art that do not depart from its scope. A skilled artisan may develop alternative means of implementing the aforementioned improvements without departing from the scope of the present disclosure.

It will be understood that certain features and sub-combinations are of utility and may be employed without reference to other features and sub-combinations and are contemplated within the scope of the claims. Not all steps listed in the various figures need be carried out in the specific order described.

CONCLUSION

Although the implementations of the disclosure have been described in language specific to structural features and/or methodological acts, it is to be understood that the implementations are not necessarily limited to the specific features or acts described. Rather, the specific features and acts are disclosed as representative forms of implementing the claims.

I claim:

1. A buoy retention and release device for a fishing apparatus, comprising:
   a mesh cylinder having a top perimeter and a bottom perimeter, the top perimeter being puckered closed in a first position and being open in a second position;
   a coupling support coupled to the mesh cylinder at the bottom perimeter, the coupling support configured to couple the mesh cylinder to the fishing apparatus;
   a drawstring threaded through the mesh cylinder at the top perimeter, the drawstring being taut in the first position and being slack in the second position, the drawstring holding the top perimeter puckered closed in the first position and releasing the top perimeter to open in the second position;
   a buoy line having a proximate end and a distal end, the buoy line being stowed within the mesh cylinder in the first position and being free to extend in the second position;
   a buoy attached to the distal end of the buoy line, the buoy being stowed within the mesh cylinder in the first position and being released from the mesh cylinder in the second position; and
   a trigger mechanism coupled to the drawstring, the trigger mechanism configured to hold the drawstring in the first position until triggered and to activate the second position when triggered.

2. The buoy retention and release device of claim 1, wherein the coupling support comprises a hoop threaded through the mesh cylinder at the bottom perimeter.

3. The buoy retention and release device of claim 1, wherein the fishing apparatus comprises a fish trap or a shellfish trap.

4. The buoy retention and release device of claim 1, wherein the fishing apparatus comprises a line retention container configured to hold the mesh cylinder and the coupling support in the first position and the second position, and to hold the buoy line and the buoy in the first position.

5. The buoy retention and release device of claim 4, wherein the line retention container comprises a wire mesh basket.

6. The buoy retention and release device of claim 4, wherein the line retention container includes a plurality of coupling points for height adjustment of the coupling support within the line retention container and wherein the coupling support is coupled to the line retention container via one or more of the plurality of coupling points, based on a desired height of the coupling support within the line retention container.

7. A retention device, comprising:
   a mesh cylinder having a top perimeter and a bottom perimeter, the top perimeter being puckered closed in a first position and being open in a second position;
   a drawstring threaded through the mesh cylinder at the top perimeter, the drawstring being taut in the first position and being slack in the second position, the drawstring holding the top perimeter puckered closed in the first position and releasing the top perimeter to open in the second position;

a buoy line having a proximate end and a distal end, the buoy line being stowed within the mesh cylinder in the first position and being free to extend in the second position;

a buoy attached to the distal end of the buoy line, the buoy being stowed within the mesh cylinder in the first position and being released from the mesh cylinder in the second position; and a trigger mechanism coupled to the drawstring, the trigger mechanism configured to hold the drawstring in the first position until triggered and to activate the second position when triggered.

8. The retention device of claim 7, further comprising a hoop threaded through the mesh cylinder at the bottom perimeter.

9. The retention device of claim 7, wherein the buoy line is coiled within the mesh cylinder and the buoy is nested on the coiled buoy line in the first position.

10. The retention device of claim 7, wherein the trigger mechanism comprises a galvanic link configured to corrode in seawater or a mechanical release device.

11. The retention device of claim 7, wherein the trigger mechanism comprises an electronic and/or acoustic remote release device.

12. A method, comprising:

providing a mesh cylinder having a top perimeter and a bottom perimeter;

coupling the bottom perimeter of the mesh cylinder to a fishing apparatus;

stowing a buoy line having a proximate end and a distal end within the mesh cylinder;

coupling a buoy to the distal end of the buoy line, and stowing the buoy within the mesh cylinder;

threading a drawstring through the top perimeter of the mesh cylinder, and pulling the drawstring taut to close the top perimeter over the buoy line and the buoy; and coupling a trigger mechanism to the drawstring to hold the drawstring taut until intentionally released.

13. The method of claim 12, further comprising attaching a coupling support to the bottom perimeter of the mesh cylinder and coupling the coupling support to the fishing apparatus.

14. The method of claim 13, wherein the coupling support comprises a hoop, and further comprising threading the hoop through the bottom perimeter of the mesh cylinder.

15. The method of claim 12, wherein the fishing apparatus comprises a fish trap or a shellfish trap.

16. The method of claim 12, wherein the fishing apparatus comprises a line retention container configured to hold the mesh cylinder, the buoy line, and the buoy.

17. The method of claim 16, further comprising coupling the bottom perimeter of the mesh cylinder to the line retention container at one of a plurality of coupling points within the line retention container to determine a height of the bottom perimeter of the mesh cylinder within the line retention container.

18. The method of claim 12, further comprising coiling the buoy line within the mesh cylinder and nesting the buoy on the coiled buoy line.

19. The method of claim 12, further comprising coupling the fishing apparatus to one or more fish traps or shellfish traps.

20. The method of claim 12, further comprising:

activating the trigger mechanism to intentionally release the drawstring, thereby causing the drawstring to slacken;

allowing the top perimeter of the mesh cylinder to open in response to the slackening of the drawstring; and allowing the buoy and the buoy line to escape from the mesh cylinder in response to the opening of the top perimeter of the mesh cylinder.

* * * * *